(12) United States Patent
Mau

(10) Patent No.: US 7,619,883 B2
(45) Date of Patent: Nov. 17, 2009

(54) INTERFACE CARD FASTENER

(75) Inventor: Shu-Hua Mau, Taipei (TW)

(73) Assignee: Lite-On Technology Corp., Taipei (TW)

( * ) Notice: Subject to any disclaimer, the term of this patent is extended or adjusted under 35 U.S.C. 154(b) by 62 days.

(21) Appl. No.: 11/957,376

(22) Filed: Dec. 14, 2007

(65) Prior Publication Data

US 2009/0034186 A1 Feb. 5, 2009

(30) Foreign Application Priority Data

Aug. 3, 2007 (TW) .............................. 96212826 U

(51) Int. Cl.
*G06F 1/16* (2006.01)

(52) U.S. Cl. .............................. 361/679.27; 348/222.1; 347/76; 439/188

(58) Field of Classification Search ............ 361/679.01, 361/679.02, 679.27, 679.56; 439/639, 175, 439/160, 188; 348/222.1, 374; 347/54, 76
See application file for complete search history.

(56) References Cited

U.S. PATENT DOCUMENTS

| 2005/0111203 | A1* | 5/2005 | Bassett et al. | 361/755 |
| 2005/0231924 | A1* | 10/2005 | Shih | 361/759 |
| 2007/0153493 | A1* | 7/2007 | Chen et al. | 361/801 |

\* cited by examiner

*Primary Examiner*—Hung V Duong

(57) ABSTRACT

A computer case with a function for fastening an interface card having an extension piece is provided. The computer case includes a positioning portion protruding from a surface of the computer case and having a connecting surface, and an interface card fastener mounted on the surface of the computer case and having a pressing surface pressing the extension piece of the interface card against the connecting surface.

18 Claims, 10 Drawing Sheets

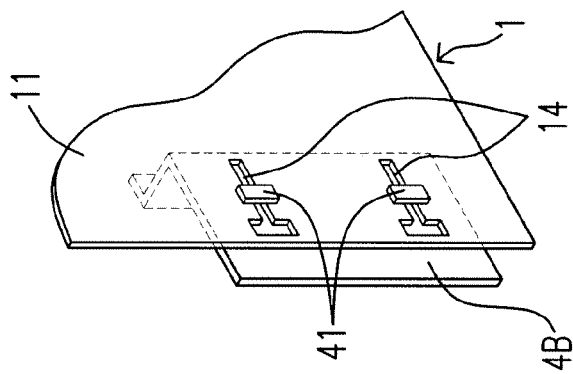
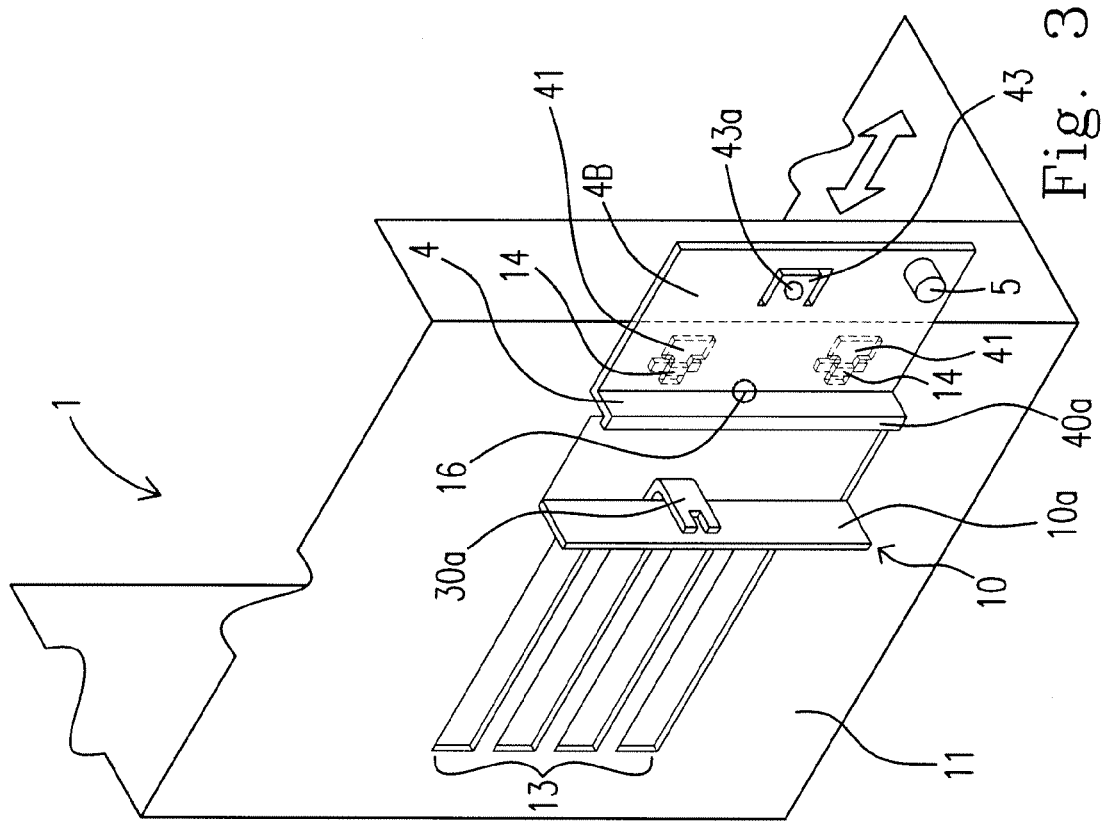

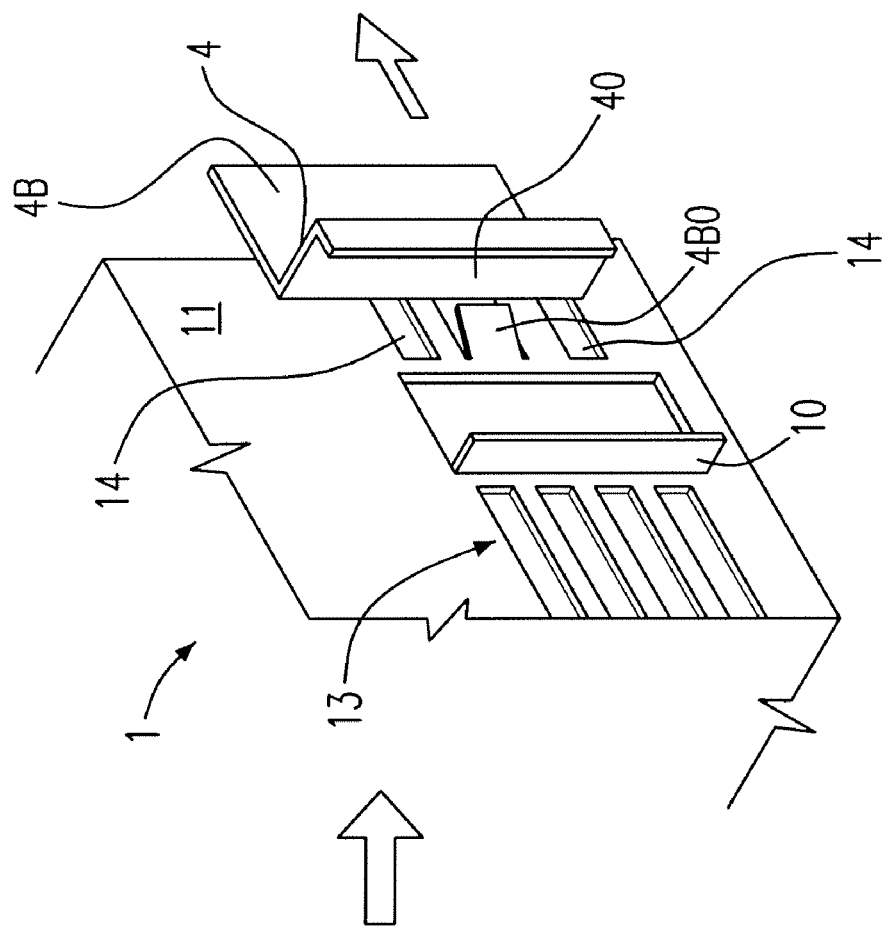
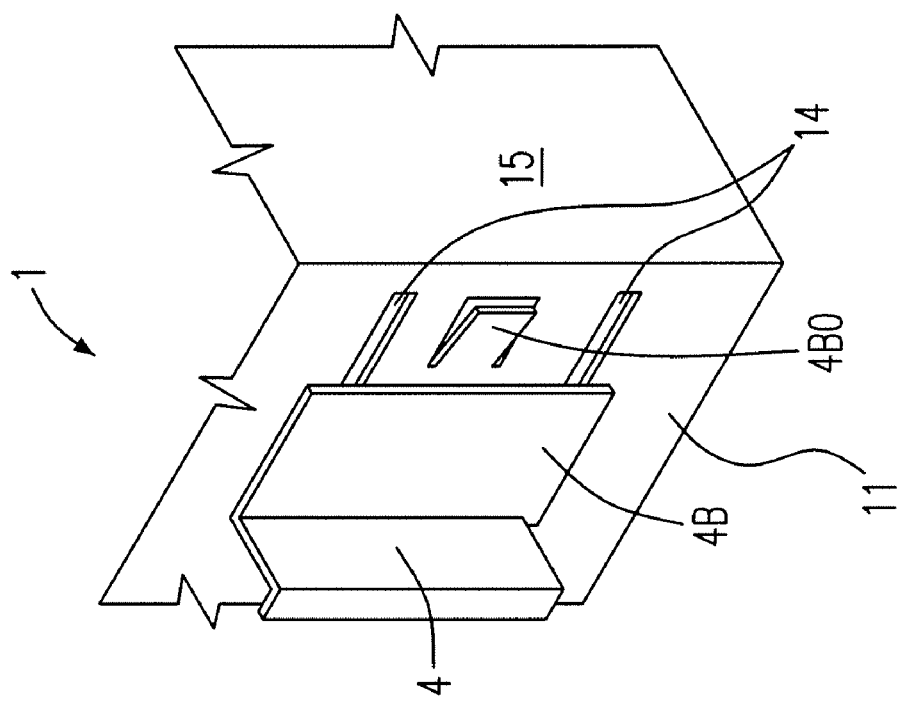
Fig. 10

INTERFACE CARD FASTENER

FIELD OF THE INVENTION

The present invention relates to a computer case, and more particularly to a computer case with a function for fastening an interface card.

BACKGROUND OF THE INVENTION

In order to improve the efficiency and efficacy of computers, or for other reasons, a common way is to configure some additional components or equipments in computers. A usual alternative is to configure interface cards to connect external equipments such as monitors, scanners, or other producing devices. These interface cards are electrically connected to a motherboard through gold fingers. There is a positioning plate at one end of an interface card for fastening the interface card with a computer case therethrough, and it presents the sockets provided for interface cards on the motherboard from baring too much weight of the interface cards. It also ensures the tight connections between the electronic contacts of the interface cards and the sockets, so that bad contacts therebetween will not happen due to external impacts.

A most common way to fasten an interface card is to lock the positioning plate thereof on the computer case through screws. Although the screws can fasten the interface card stably, a screwdriver is always necessary whenever the screws are to be locked or released. It often happens that a user drops the screws on the ground, and the dropped screws may cause accidents. For examples, the dropped screws may damage other components nearby, or cause a short circuit; the dropped screws often get lost, too. These problems bother the users a lot. In addition, it is time-consuming to screw the screws for several turns to lock the screws.

Moreover, another problem is that the fee for technical workers in some areas to lock screws is counted in a cost-per-screw basis. When using such a huge number of screws for producing a huge number of computers, the number of screws takes a big part in the cost per unit. In such a competitive market of computer industry, it is also an important goal to save costs in many aspects. Hence, reducing the number of screws is an important part in reducing the cost.

Therefore, because it is inconvenient and costly when using screws as fastening components, the present invention provides an inventive device to fasten the interface card on the computer case, or release it therefrom rapidly. A structure is provided for pressing the extension plate of the interface card against a positioning portion of the computer case, so as to avoid a relative motion therebetween. Besides the advantage of overcoming the problem of using screws, the present invention further reduces the cost, and provides a convenient use for general users and consumers without worrying about the screws.

SUMMARY OF THE INVENTION

In accordance with one aspect of the present invention, an interface card fastener is provided. The interface card fastener is used to fasten an interface card with a computer case, so that the interface card would not be moved easily. Furthermore, through a mechanism design, a user can fasten the interface card with the computer case manually without any other tools like screwdrivers or wrenches. Accordingly, the operations for installing and changing the interface card will be very simple, and can be achieved rapidly and accurately.

In accordance with another aspect of the present invention, a computer case with a function for fastening an interface card is provided, wherein the interface card has an extension piece. The computer case includes a positioning portion protruding from a surface of the computer case and having a connecting surface, and an interface card fastener mounted on the surface of the computer case and having a pressing surface pressing the extension piece of the interface card against the connecting surface, wherein the interface card fastener is movable.

Preferably, the extension piece is an extension plate, and the pressing surface, the extension plate and the pressing surface are parallel to one another when the interface card is fastened.

Preferably, the computer case further includes a pivot for mounting the interface card fastener on the surface therethrough.

Preferably, the pivot has an axis perpendicular or parallel to the surface of the computer.

Preferably, the computer case further includes a sliding device mounted between the surface of the computer case and the interface card fastener, wherein the sliding device comprises a guiding groove and a guiding bump sliding in the guiding groove.

Preferably, the guiding groove is located on the surface of the computer case when the guiding bump is mounted on the interface card fastener, and the guiding groove is located on the interface card fastener when the guiding bump is mounted on the surface of the computer case.

Preferably, the computer case further includes a side plate connected to the surface of the computer case for pressing the interface card fastener against the connecting surface so that the pressing surface presses the extension piece against the connecting surface.

In accordance with a further aspect of the present invention, an interface card fastener mounted on a computer case is provided. The interface card fastener includes a body pivotally connected to a surface of the computer case, and a pressing plate extending from the body for pressing an extension plate of an interface card against a connecting surface protruded from the surface of the computer case.

Preferably, the computer case includes a positioning portion which the connecting surface is formed on.

Preferably, the interface card fastener is mounted on an exterior of the computer case.

Preferably, the interface card fastener further includes a locking element for locking the interface card fastener on the surface of the computer case.

Preferably, the pressing plate presses a plurality of extension plates of a plurality of interface cards against the connecting surface of the computer case simultaneously.

Preferably, the body is connected to the surface of the computer case through a pivot, and an axis of which is perpendicular to the surface of the computer case.

Preferably, the body is connected to the surface of the computer case through a pivot, and an axis of which is parallel to the surface of the computer case.

Preferably, the interface card fastener further includes an elastic element mounted on the pressing plate for further pressing the extension plate against the connecting surface.

Preferably, the interface card fastener further includes a blocking plate extending from the pressing plate for preventing the extension plate from sliding.

In accordance with another further aspect of the present invention, an interface card fastener is provided. The interface card fastener includes a body mounted on a surface of a computer case and slidable thereon, and a pressing plate extending from the body for pressing an extension plate of an interface card against a connecting surface protruding from the surface of the computer case.

Preferably, the interface card fastener further includes a guiding bump mounted on the body, wherein the surface of the computer case has a guiding groove for the guiding bump sliding therein.

Preferably, the surface of the computer case has a guiding bump, and the body has a guiding groove for the guiding bump sliding therein.

Preferably, the interface card fastener further includes a locking element for locking the interface card fastener on the surface of the computer case.

Additional objects and advantages of the invention will be set forth in the following descriptions with reference to the accompanying drawings, in which:

BRIEF DESCRIPTION OF THE DRAWINGS

FIG. 3 is a schematic diagram showing the interface card fastener according to another preferred embodiment in the present invention;

FIG. 3(a) is a schematic diagram showing the guiding grooves and guiding bumps of FIG. 3;

FIG. 10 is another schematic diagram showing the interface card fastener accommodating to a computer case according to the preferred embodiment shown in FIG. 3 in the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
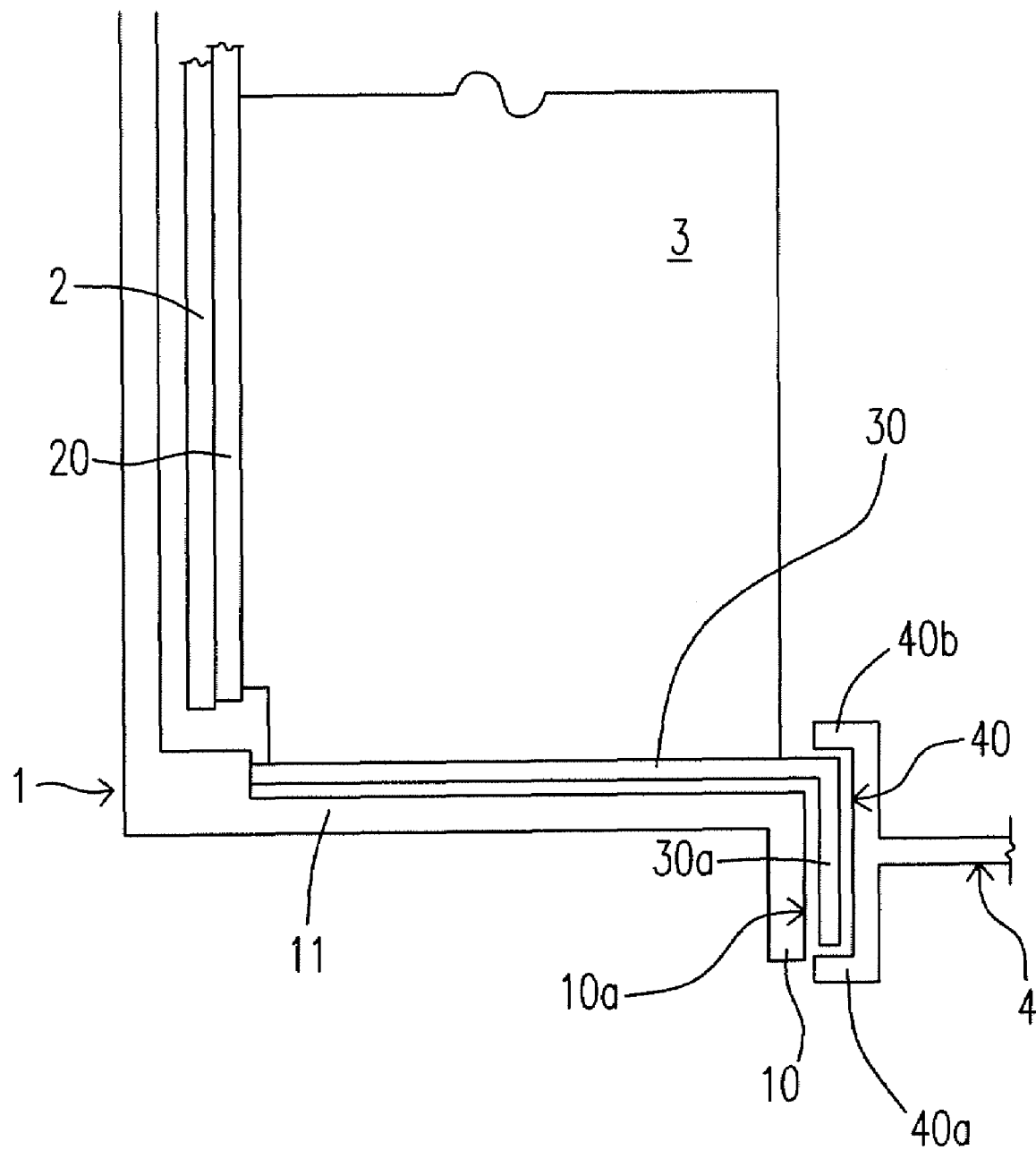
FIG. 1 is a partial cross-sectional diagram showing the using status of the interface card fastener in the present invention.

Please refer to FIG. 1, which is a partial cross-sectional diagram showing the using status of the interface card fastener in the present invention. A motherboard 2 is mounted in a computer case 1, and an interface card 3 (an expansion card or a PCI card) is electrically connected to a central processing unit (CPU) 2 through a socket 20. The interface card 3 has a positioning plate 30 facing a backside 11 of the computer case, and an extension plate 30a extends from the positioning plate 30 and is adjacent to a positioning portion 10 protruding from a surface of the backside 11 of the computer case 1. Practically, the positioning portion 10 is a plane structure approaching to the extension plate 30a, and a connecting surface 10a of the positioning portion 10 stays close to the extension plate 30a so as to be clipped with the extension plate 30a. The interface card fastener 4 in the present invention uses a pressing surface 40 to push the extension plate 30a so that the extension plate 30a can stay close to the connection surface 10a. Accordingly, the present invention provides three plane-shape objects clipped to one another to fasten the interface card 3, and thus as long as the pressing surface 40 keeps pushing the extension plate 30a, the interface card 3 will not be moved easily. Please further refer to the following descriptions and drawings showing how to fasten the interface card fastener 4 of the present invention. In addition, in order to facilitate the fastening, the interface card fastener 4 further includes a first blocking plate 40a and a second blocking plate 40b extending from the pressing surface 40 and respectively located in front and at the back of the extension plate 30a, so as to prevent the extension plate 30a from moving back and forth.

Figure 2:
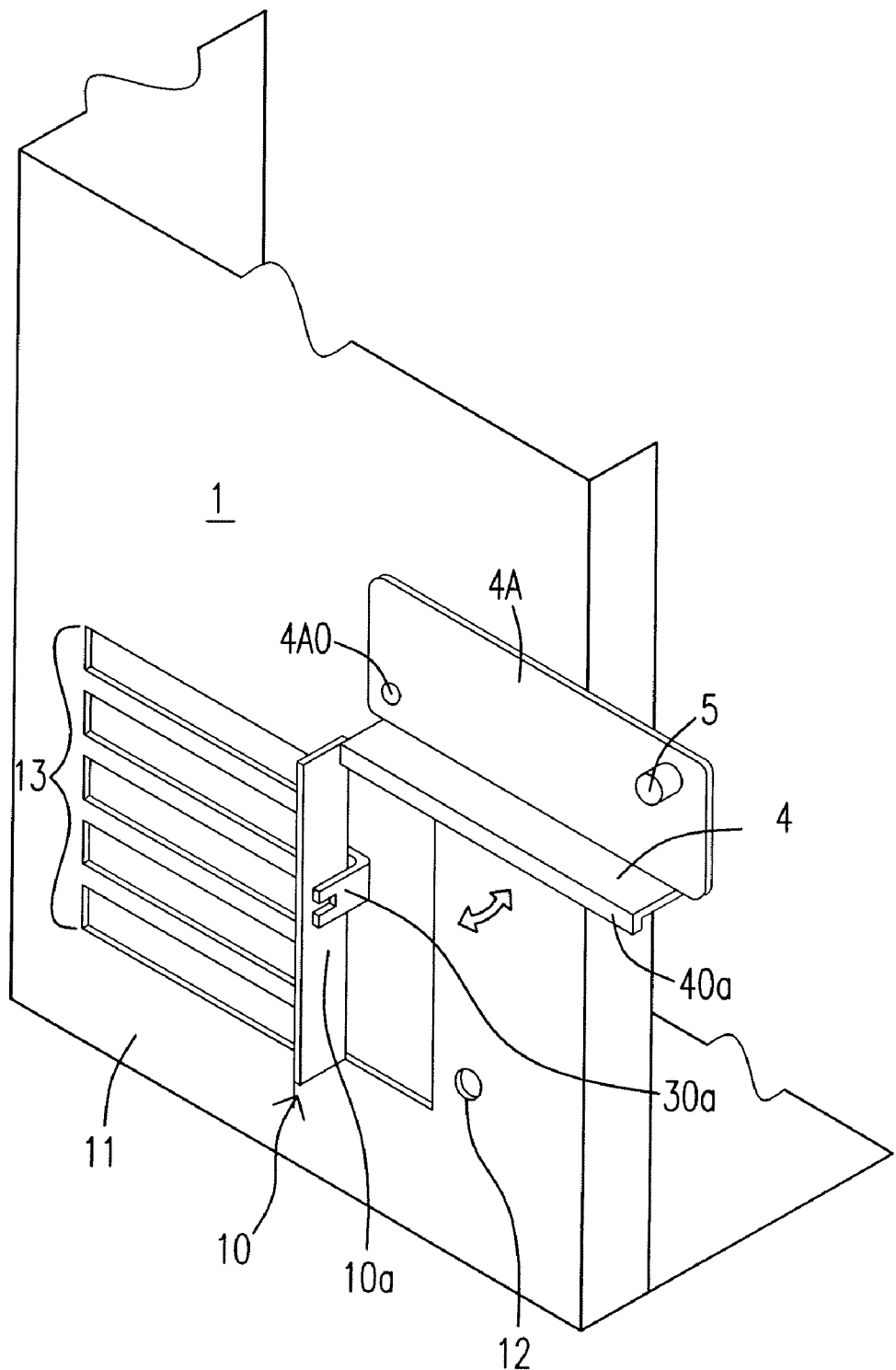
FIG. 2 is a schematic diagram showing the interface card fastener according to a preferred embodiment in the present invention.

Please refer to FIG. 2, which shows a schematic diagram of the interface card fastener according to a preferred embodiment in the present invention, wherein the backside 11 of the computer case 1 has a plurality of openings 13 for exposing a plurality of interface cards. In order to make the use of the interface card fastener 4 of the present invention more convenient, there is a first rotating body 4A mounted between the interface card fastener 4 and the computer case 1. The first rotating body 4A is pivotally mounted on the backside 11 of the computer case 1 through a first pivot 4A0, and the interface card fastener 4 can approach or get away from the extension plate 30a by using the first rotating body 4A. That is, when the first rotating body 4A rotates (in the clockwise direction as shown in FIG. 2), and approaches and pushes the extension plate 30a, the extension plate 30a will press against the connecting surface 10a of the positioning portion 10 because of the pressing of the interface card fastener 4, so that the interface card 3 is fastened (please also refer to FIG. 1). On the other hand, the interface card 3 will not contact the connecting surface 10a when rotating the first rotating body 4A (in the counterclockwise direction as shown in FIG. 2) to get the interface card fastener 4 away from the extension plate 30a. Therefore, the use of the interface card fastener 4 of the present invention is more efficient by employing the first rotating body 4A. Moreover, in order to prevent the interface card fastener 4 from being pushed back by a counterforce after it presses the extension plate 30a, the first rotating body 4A further includes a locking element 5 mounted thereon. After the interface card fastener 4 presses the extension plate 30a, the locking element 5 is screwed and locked into a screw hole 12 of the backside 11 of the computer case 1 to fasten the interface card fastener 4. The locking element 5 can be designed as a tool-free screw, and the users and operators can lock or release the locking element 5 manually, so that the assembly can be implemented more efficiently. Certainly, the locking element 5 can be any type of elements such as a pin, which can fasten the interface card fastener 4 with the backside 11 of the computer case 1 to prevent a relative movement therebetween. Furthermore, the interface card fastener 4 shown in FIG. 2 further has a first blocking plate 40a, where the function thereof is described in the descriptions regarding FIG. 1.

Please refer to FIG. 3, which is a schematic diagram showing the interface card fastener according to another preferred embodiment in the present invention. The backside 11 of the computer case 1 has a plurality of openings 13 for exposing a plurality of interface cards, and also has a positioning portion 10 with a connecting surface 10a. In order to make the use of the interface card fastener 4 of the present invention more convenient, there is a sliding body 4B mounted between the interface card fastener 4 and the computer case 1, and the sliding body 4B can approach or get away from the extension plate 30a by linearly sliding back and forth. Therefore, as shown in FIG. 3, when the sliding body 4B shifts to the left, the interface card fastener 4 approaches and pushes the extension plate 30a to fasten the interface card 3 (please also refer to FIG. 1). On the other hand, the interface card 3 can be released when the sliding body 4B shifts to the right, so that the extension plate 30a will not contact the connecting surface 10a. Please refer to FIG. 3(a), which is a schematic diagram showing the guiding grooves and guiding bumps of FIG. 3. FIG. 3(a) shows a view looking from the inside of the backside 11 of the computer case 1, wherein guiding grooves 14 and guiding bumps 41, which are covered by the sliding body 4B in FIG. 3, are shown therein. The guiding grooves 14 are located at the backside 11 of the computer case 1, and the guiding bumps 41 are mounted on the sliding body 4B and sliding in the guiding grooves 14, so that the sliding body 4B can slide linearly and steadily. In addition, in order to prevent the sliding body 4B from sliding when it presses the extension plate 30a against the connecting surface 10a, the sliding body 4B further includes a locking element 5, where the function thereof is described in the descriptions regarding FIG. 2. Moreover, in order to facilitate the positioning of the sliding body 4B, a blocking elastic element 43 having a blocking bump 43a is mounted thereon. When the sliding body 4B presses the extension plate 30a, the blocking bump 43a is pushed into a hole 16 by the bounce of the blocking elastic element 43, so that the blocking bump 43a is blocked by the hole 16 and the sliding body 4B will not be sprung by the counterforce of the extension plate 30a. More blocking elastic elements 43, blocking bumps 43a and holes 16 can be configured for improving the blocking function.

Figure 4A:
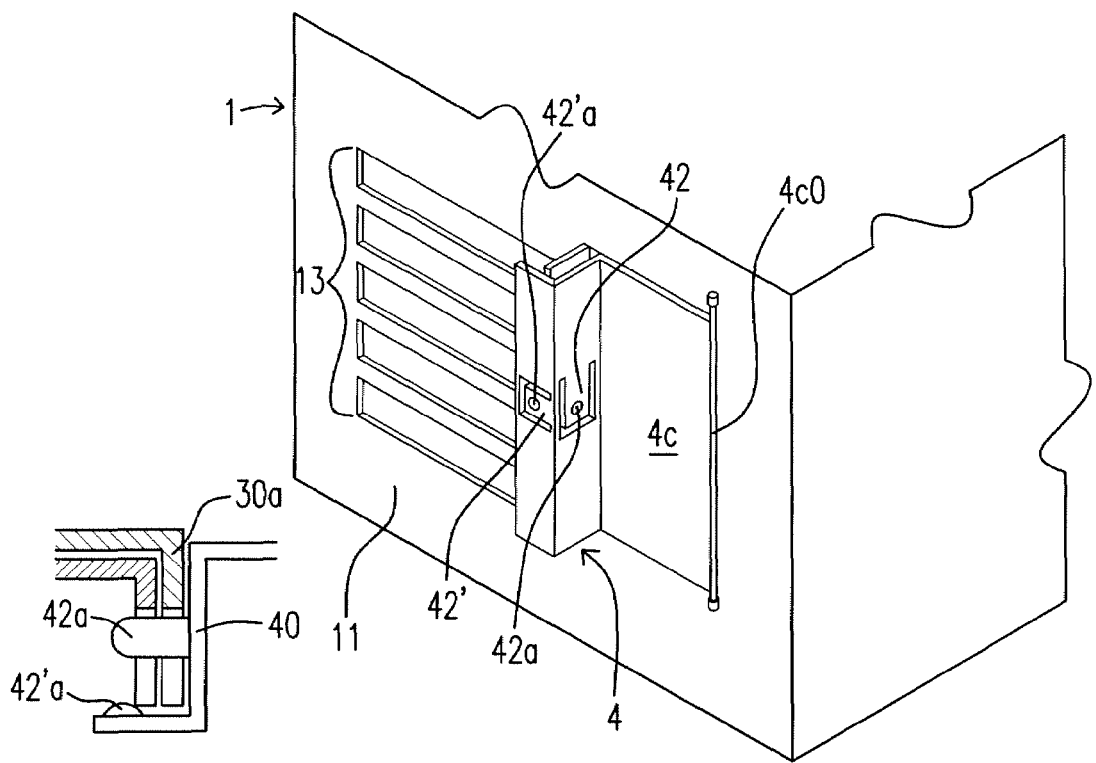
FIG. 4(a) is a cross-sectional diagram showing that the pressing surface, the extension plate, and the positioning portion are fastened to one another.
Figure 4:
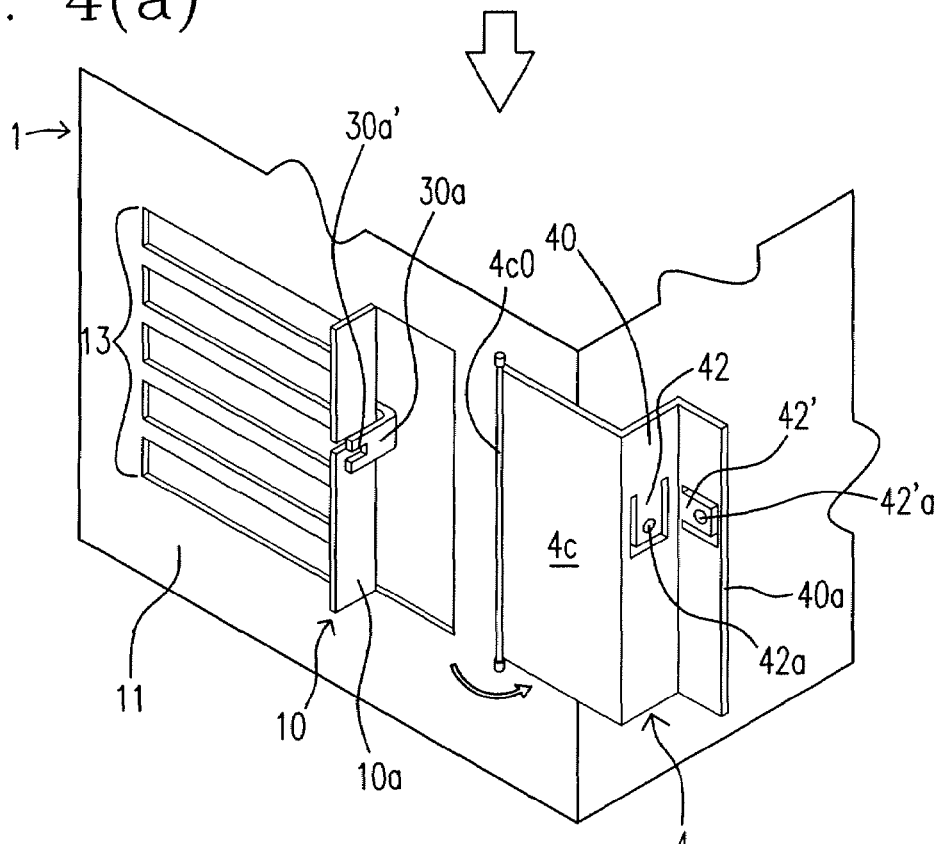
FIG. 4 is a schematic diagram showing the interface card fastener according to a further preferred embodiment in the present invention.

Please refer to FIG. 4, which is a schematic diagram showing the interface card fastener according to a further preferred embodiment in the present invention. The backside 11 of the computer case 1 has a plurality of openings 13 for exposing a plurality of interface cards, and a positioning portion 10 with a connecting surface 10a. The interface card fastener 4 further includes a second rotating body 4C connected to the backside 11 of the computer case 1 through a second pivot 4C0, so that the second rotating body 4C can rotate on the computer case 1. The second pivot 4C0 is different from the first pivot 4A0 shown in FIG. 2, wherein the axis of the first pivot 4A0 is perpendicular to the surface of the backside 11 of the computer case 1, and the axis of the second pivot 4C0 is parallel to the surface of the backside 11 of the computer case 1. Hence, the second rotating body 4C can be open and closed like a door. As shown in the upper part of FIG. 4, when the second rotating body 4C rotates to the left and presses the pressing surface 40 against the extension plate 30a, the extension plate 30a will be pressed against the connecting surface 10a to fasten the interface card 3 (please also refer to the relative positions thereof shown in FIG. 1). On the contrary, as shown in the lower part of FIG. 4, if the second rotating body 4C rotates to the right, the pressing surface 40 gets away from the extension plate 30a, and the interface card 3 is unfastened. In addition, the pressing surface 40 further has an elastic element 42 for improving the pressing function of the pressing surface 40. Usually, the elastic element 42 may protrude from the pressing surface 40, or has a pressing bump 42a to combine with a breach 30a' of the extension plate 30 of the interface card 3. Please refer to FIG. 4(a), which shows a cross-sectional diagram when the pressing surface 40, the extension plate 30a, and the positioning portion 10 are fastened to one another, wherein the pressing bump 42a penetrates the positioning portion 10, and the interface card 3 are fastened more tightly through the combination of the pressing bump 42a, the extension plate 30a and the positioning portion 10. Furthermore, the interface card fastener 4 as shown in FIG. 4 further includes a first blocking plate 40a, where the function thereof is described in the descriptions regarding FIG. 1. Besides, a buckling piece 42' can be selectively mounted on the first blocking plate 40a, and a buckling bump 42'a can be formed on the buckling piece 42'. As shown in FIG. 4(a), the buckling bump 42'a buckles with the positioning portion 10, so that the second rotating body 4C will not be released easily. The design of the buckling piece 42' provides an extra elastic ability for the buckling bump 42'a, so that the user can bend the buckling piece 42' to release the second rotating body 4C from the buckled status.

Figure 5A:
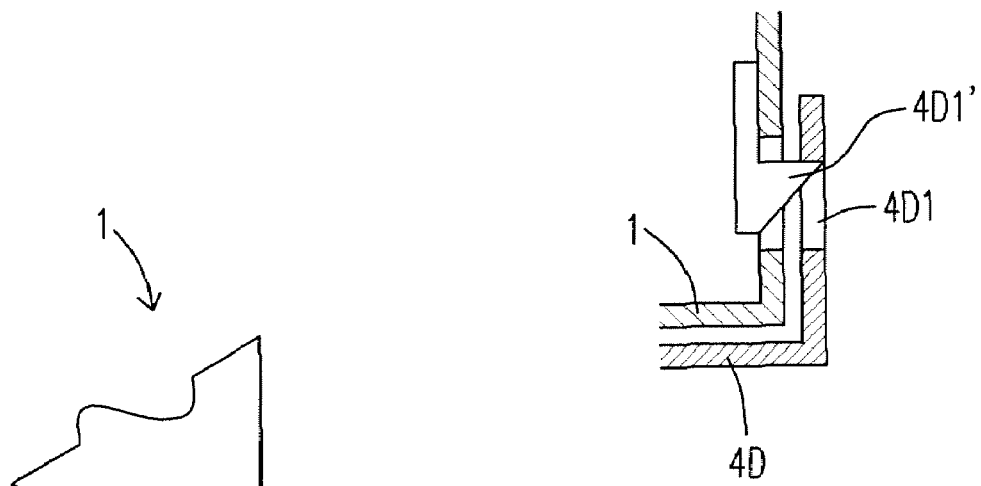
FIG. 5(a) is a partial cross-sectional diagram showing a buckling hole and a buckling hook.
Figure 5:
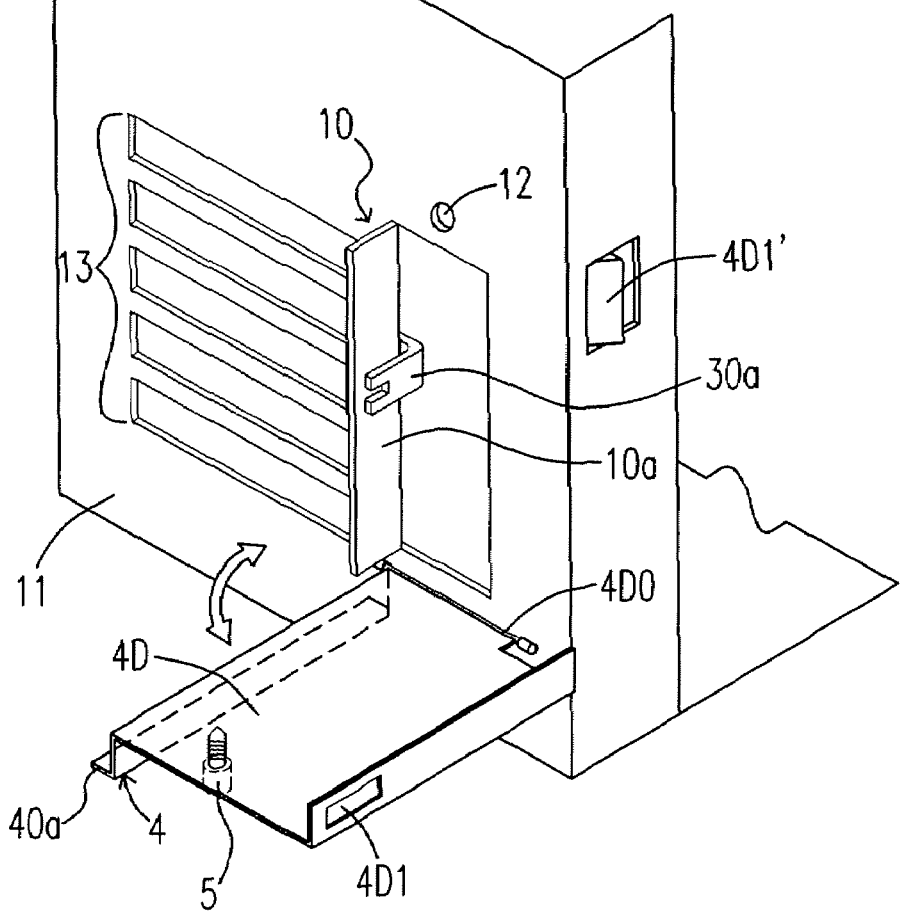
FIG. 5 is a schematic diagram showing the interface card fastener according to another further preferred embodiment in the present invention.

Please refer to FIG. 5, which is a schematic diagram showing the interface card fastener according to another further preferred embodiment in the present invention. The backside 11 of the computer case 1 has a plurality of openings 13 for exposing a plurality of interface cards, and a positioning portion 10 with a connecting surface 10a. The interface card fastener 4 further includes a third rotating body 4D connected to the backside 11 of the computer case 1 through a third pivot 4D0, so that the third rotating body 4D can rotate on the computer case 1. The third pivot 4D0 shown in FIG. 5 is different from the first pivot 4A0 shown in FIG. 2, where an axis of the first pivot 4A0 is perpendicular to the surface of the backside 11 of the computer case 1, while an axis of the third pivot 4D0 is parallel to the surface of the backside 11 of the computer case 1 and the ground, and thus the third rotating body 4D can swing upward and downward like a bascule bridge. When the third rotating body 4D swings upward toward the surface of the backside 11, the pressing surface 40 (referring to FIG. 1) of the interface card fastener 4 presses against the extension plate 30a, and the extension plate 30a is pressed against the connecting surface 10a, so that the interface card 3 is fastened (please further refer to the relative positions of the connecting surface 10a, the extension plate 30a and the pressing surface 40 as shown in FIG. 1). On the contrary, if the third rotating body 4D swings downward, the pressing surface 40 will be released from the extension plate 30a, and the third rotating body 4D no longer stays close to the surface of the backside 11 of the computer case 1, so that the interface card 3 is unfastened. Further, a locking element 5 can be selectively mounted on the third rotating body 4D of the present embodiment as shown in FIG. 5. The locking element 5 is locked in a screw hole 12 located at the backside 11 of the computer case 1 to maintain the fastened status of the third rotating body 4D. Please refer to FIG. 5(a), which is a partial cross-sectional diagram showing a buckling hole and a buckling hook. FIG. 5(a) discloses that the third rotating body 4D has a buckling hole 4D1 buckled to a buckling hook 4D 1' mounted on the computer case 1, so that the third rotating body 4D can be fastened on the computer case 1 without the locking element 5. When the third rotating body swings upward such that the pressing surface 40 is pressed against the extension plate 30a, the buckling hole 4D1 is buckled by the buckling hook 4D1'. When the buckling hook 4D 1' is pressed into the computer case 1 so as to depart from the buckling hole 4D1, the third rotating body 4D can swing downward and be released, so that the pressing surface 40 no longer presses against the extension plate 30a. Accordingly, using the cooperation of the buckling hole 4D1 and the buckling hook 4D1' is more convenient and efficient than using that of the locking element 5 and the screw hole 12. However, both of the combinations can be applied. In addition, the interface card fastener 4 further has a first blocking plate 40a, where the function thereof is described in the descriptions regarding FIG. 1.

Figure 6:
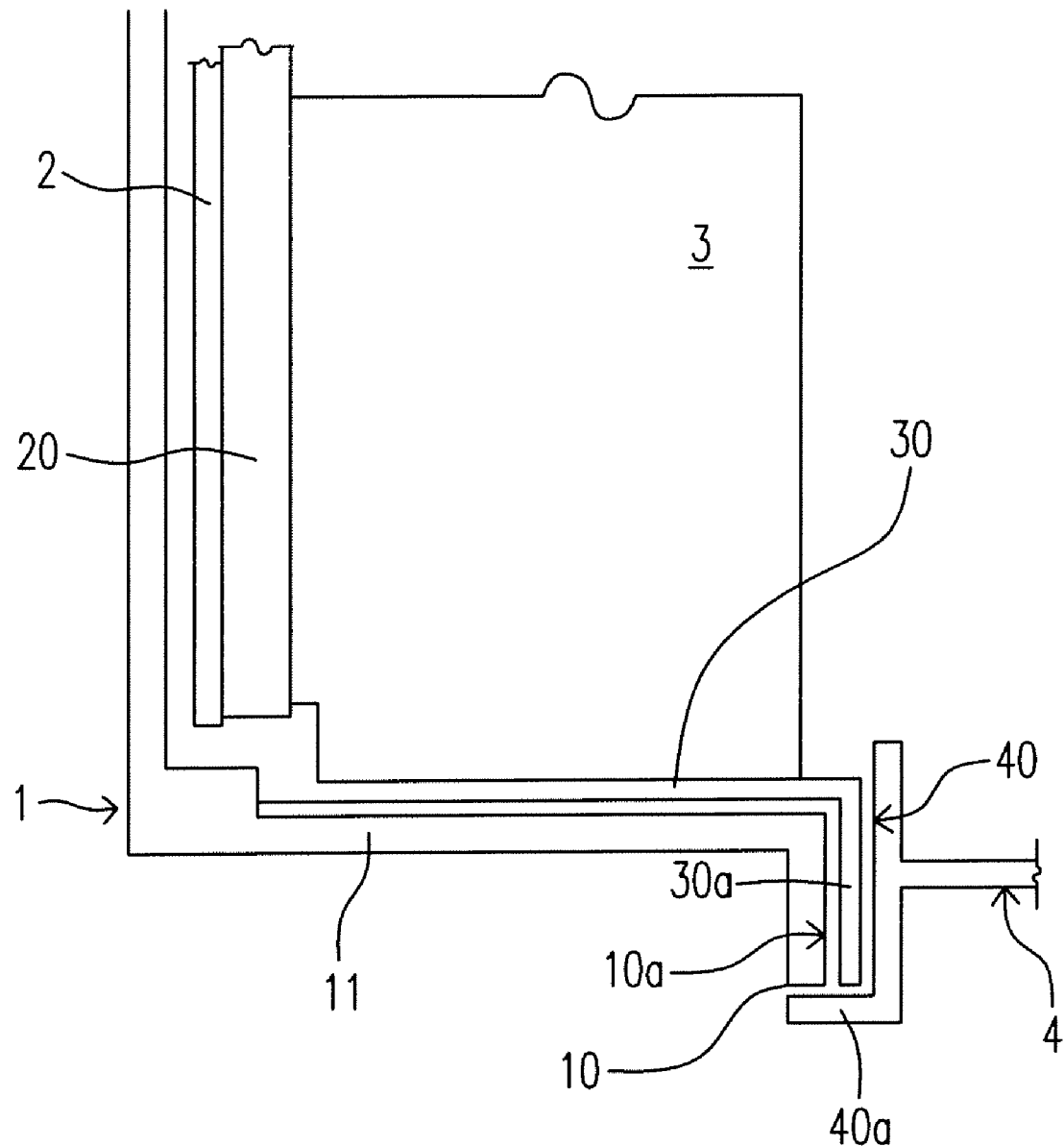
FIG. 6 is a partial cross-sectional diagram showing the using status of the interface card fastener shown in FIGS. 4 and 5 in the present invention.

Please refer to FIG. 6, which is a partial cross-sectional diagram showing the using status of the interface card fastener shown in FIGS. 4 and 5 in the present invention. As described in the descriptions regarding FIG. 1, an interface card 3 (expansion card) is mounted in the computer case 1 and has a positioning plate 30 facing a backside 11 of the computer case 1. An extension plate 30a extends from the positioning plate 30 and is adjacent to a positioning portion 10 protruding from a surface of the backside 11 of the computer case, where the positioning portion 10 is usually a plane structure having a connecting surface 10a for staying close and being clipped to the extension plate 30a. Because the second rotating body 4C shown in FIG. 4 and the third rotating body 4D shown in FIG. 5 approach the connecting surface 10 nearly along the connecting surface 10 to press the extension plate 30a, the second blocking plate 40b shown in FIG. 5 will block the approaching path of the second and third rotating bodies 4C and 4D. Therefore, the interface card fastener 4 shown in FIG. 6 only has the first blocking plate 40a without the second blocking plate 40b. The function of the first blocking plate 40a is described in the descriptions regarding FIG. 1.

Figure 7:
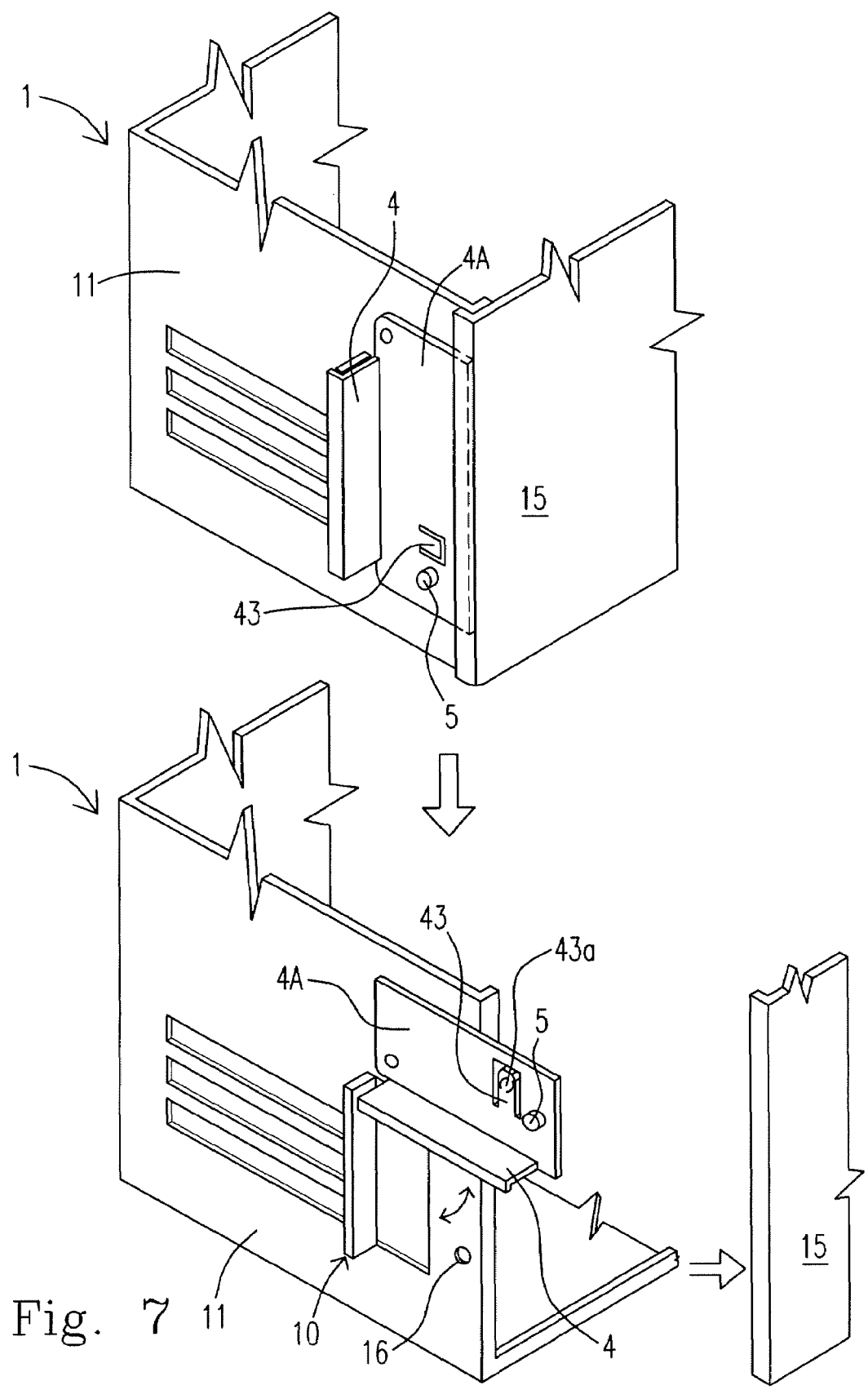
FIG. 7 is a schematic diagram showing the interface card fastener accommodating to a computer case according to a preferred embodiment in the present invention.

Please refer to FIG. 7, which is a schematic diagram showing the interface card fastener accommodating to a computer case according to a preferred embodiment in the present invention. The first rotating body 4A shown in FIG. 2 is provided herein for explanations, where a side plate 15 is mounted at a lateral of the computer case 1 when the first rotating body 4A is pressing against the positioning portion 10. As shown in FIG. 7, the side plate 15 is used to hold the first rotating body 4A; that is, the width of the first rotating body 4A is exactly aligned to the surface of the side plate 15. Thus, the side plate 15 must be dismantled from the computer case 1 when a user wants to remove or change the interface card 3, and then the first rotating body 4A can be released form the side plate 15. As a result, the locking element 5 will be unnecessary if the side plate 15 is used to fasten the first rotating body 4A. Another option is to configure a blocking elastic element 43 on the first rotating body 4A, where the function of the blocking elastic element 43 is the same as that shown in FIG. 3. Further, the blocking elastic element 43 has a blocking bump 43a mounted thereon and pushed into a hole 16 by the bounce of the blocking elastic element 43, so that the blocking bump 43a is blocked by the hole 16, and the first rotating body 4A will not be sprung by the counterforce of the extension plate 30a. Certainly, the blocking elastic element 43 and the locking element 5 can be mounted on the first rotating body 4A simultaneously or separately.

Figure 8:
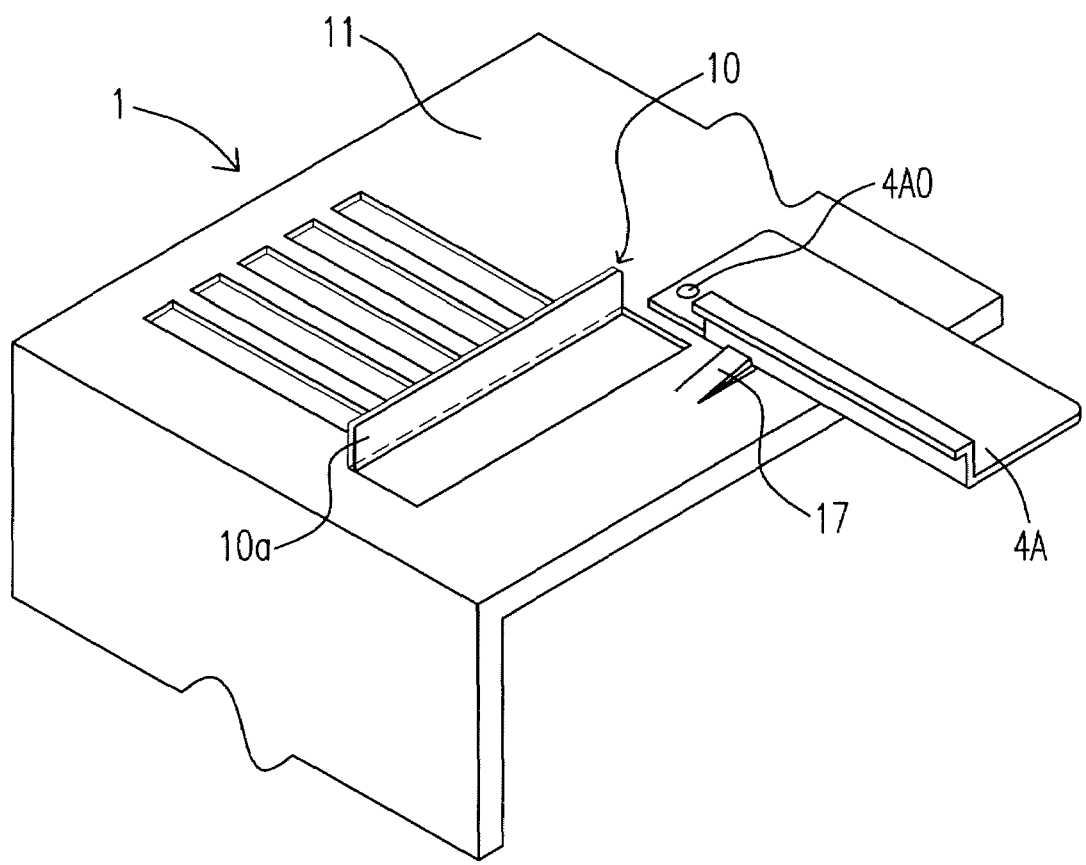
FIG. 8 is a partial schematic diagram showing the interface card fastener when it is open according to the preferred embodiment shown in FIG. 2 in the present invention.

Please refer to FIG. 8, which is a partial schematic diagram showing the interface card fastener when it is open according to the preferred embodiment shown in FIG. 2 in the present invention, wherein a positioning portion 10 having a connecting surface 10a is formed on the surface of the backside 11 of the computer case 1. FIG. 8 further discloses that the first rotating body 4A can be blocked by a bump element 17 slightly protruding from the surface of the backside 11 of the computer case 1 when it swing over the bump element 17 and is in an open status, so that the first rotating body 4A will not fall due to the gravity thereof. The bump element 17 can be pressed into the computer case 1 so as not to block the rotating path of the first rotating body 4A, and the first rotating body 4A will fall consequently. The bump element 17 can be designed to use the original material (i.e. the piece structure) of the backside 11 of the computer case 1, and is shaped during punching processes. The bump element 17 can be an additional component mounted on the backside 11 of the computer case 1 for blocking the first rotating body 4A from falling due to the gravity thereof. Therefore, the design of the bump element 17 make the present invention more convenient for use, and the material thereof can be metal, polymer or composite material.

Figure 9:
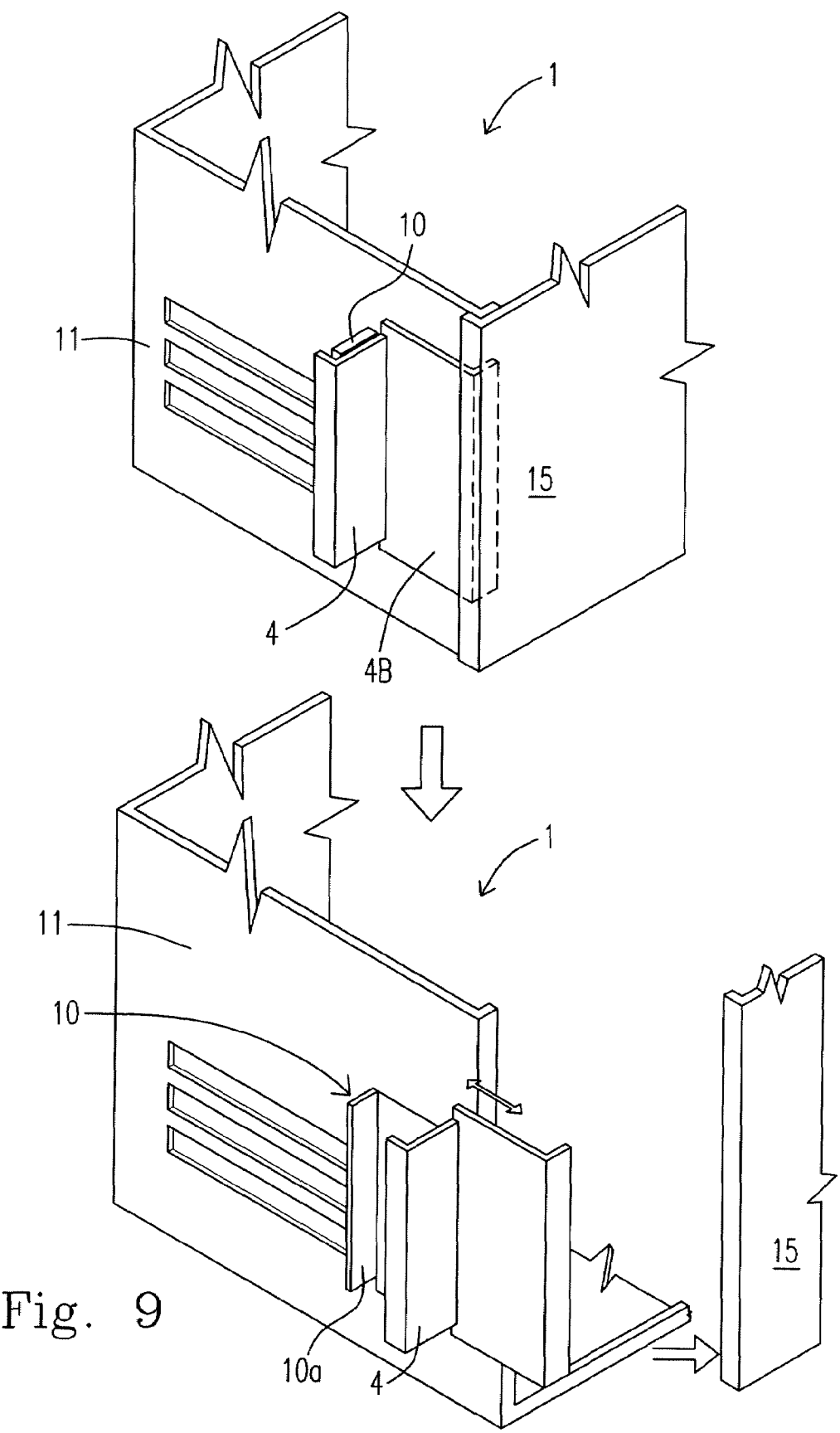
FIG. 9 is a schematic diagram showing the interface card fastener accommodating to a computer case according to the preferred embodiment shown in FIG. 3 in the present invention.

Please refer to FIG. 9, which is a schematic diagram showing the interface card fastener accommodating to a computer case according to the preferred embodiment shown in FIG. 3 in the present invention. The sliding body 4B shown in FIG. 3 is provided herein for explanations, where the interface card fastener 4 is mounted on the sliding body 4B. A side plate 15 is mounted at a lateral of the computer case 1 when the sliding body 4B is pressing against the positioning portion 10 (referring to the lower part of FIG. 9). As shown in FIG. 9, the side plate 15 is used to hold the sliding body 4B; that is, the width of the first rotating body 4A is exactly aligned to the surface of the side plate 15. Thus, the side plate 15 must be dismantled from the computer case 1 when a user wants to remove or change the interface card 3, and then the sliding body 4B can be released from the side plate 15 and slide away as shown in the lower part of FIG. 9, so that the connecting surface 10a of the positioning portion 10 is exposed. As a result, the locking element 5 will be unnecessary if the side plate 15 is used to fasten the sliding body 4B (please further refer to FIG. 3).

Please refer to FIG. 10, which is another schematic diagram showing the interface card fastener accommodating to a computer case according to the preferred embodiment shown in FIG. 3 in the present invention, wherein the sliding body 4B slides on the backside 11 of the computer case 1 through two guiding grooves 14, and an assisting blocking element 4B0 is mounted on the backside 11 of the computer case 1. If a user wants to release the sliding body 4B from the pressing status (as shown in FIG. 1), firstly he needs to press the assisting blocking element 4B0 into the backside 11 of the computer case 1, and move the sliding body 4B0 to the right as shown in FIG. 10. When the sliding body 4B passes through the assisting blocking body 4B0 without pressing it, the assisting blocking body 4B0 springs itself because of its own bounce. Thus, the assisting blocking body 4B0 blocks the sliding path of the sliding body 4B, so that the sliding body 4B will not move toward the positioning portion 10 accidentally and interfere the assembling and disassembling processes of the interface card 3 (please further refer to FIG. 1). The assisting blocking body 4B0 can be designed to be made of the original material (i.e. the piece structure) of the backside 11 of the computer case 1, and is shaped during punching processes. The assisting blocking body 4B0 can also be an additional component mounted on the backside 11 of the computer case 1 for blocking the sliding path of the sliding body 4B. Equivalent elements of the assisting blocking body 4B0 can be made of metal, polymer or composite material.

In conclusion, the present invention provides an interface card fastener 4, which uses a single structure to press the interface card 3 against the connecting surface 10a of the positioning portion 10 protruding from the surface of the backside 11 of the computer case 1. In other words, the interface card fastener 4, the extension plate 30a and the positioning portion 10 are plane-shape structures and stay close to one another as shown in FIG. 1. As shown in FIGS. 2, 4 and 5, the present invention further provides the interface card fastener 4 able to rotate for fastening the interface card 3, where the interface card fastener 4 can rotate to approach or get away from the positioning portion 10, so as to fasten or release the extension plate 30a of the interface card 3. In another aspect, the first rotating body 4A shown in FIG. 2, the sliding body 4B shown in FIG. 3, the second rotating body 4C shown in FIG. 4, and the third rotating body shown in FIG. 5 can be regarded as the body of the interface card fastener 4 of the present invention. A pressing surface 40 is formed on the body; that is, the pressing surface 40 is connected to the computer case 1 through the body (4A, 4B, 4C, and 4D), where the body can be pivotally connected to the computer case 1 (as shown in FIGS. 2, 4, and 5), or can be slidably connected thereto (as shown in FIG. 3). Moreover, all of the embodiments provided in the present invention have a feature in common that the interface card fastener 4 is still connected to the computer case 1 when in an open status, wherein the interface card fastener 4 is connected to the computer case 1 through the pivot as shown in FIGS. 2, 4, and 5, or is connected to the computer case 1 through the guiding grooves 14 and guiding bumps 41 as shown in FIG. 3. Therefore, a user will not lose the interface card fastener 4 or drop it on the ground just like when using screws, and thus the present invention provides a high convenience. Another advantage of the present invention is that the interface card fastener 4 is mounted at the exterior of the computer case 1, i.e. the exterior of the backside 11 of the computer case 1. Accordingly, the interface card fastener 4 does not need to occupy a space in the computer case 1. Because current PCI cards are different in their circuit boards and have different sizes, but the positioning plates (extension plate) 30 thereof are in the same size, the interface card fastener 4 mounted at the exterior of the backside 11 of the computer case 1 will not interfere, and has nothing to do with the configurations of the PCI cards inside the computer case 1, and thus the present invention can highly collocate the PCI cards. Furthermore, because the present invention is mounted at the exterior of the computer case 1, it will not be affected by the space of the computer case 1. Namely, the present invention will not interfere the assembly and disassembly of the PCI cards. As shown in FIGS. 2-5, when the interface card fastener 4 is released from the extension plate 30a, the whole working area is empty, which makes the assembly and disassembly of the PCI cards very convenient. Therefore, the interface card fastener of the present invention provides a convenient and low-cost assembling process of the interface card.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A computer case with a function for fastening an interface card having an extension piece, comprising:
   a positioning portion protruding from a surface of the computer case and having a connecting surface; and
   an interface card fastener mounted on the surface of the computer case and having a pressing surface pressing the extension piece of the interface card against the connecting surface, wherein the extension piece is an extension plate, and the pressing surface, the extension plate and the connecting surface are parallel to one another when the interface card is fastened.

2. A computer case according to claim 1 further comprising a pivot for mounting the interface card fastener on the surface therethrough.

3. A computer case according to claim 2, wherein the pivot has an axis perpendicular or parallel to the surface of the computer.

4. A computer case according to claim 1 further comprising a sliding device mounted between the surface of the computer case and the interface card fastener, wherein the sliding device comprises a guiding groove and a guiding bump sliding in the guiding groove.

5. A computer case according to claim 4, wherein the guiding groove is located on the surface of the computer case when the guiding bump is mounted on the interface card fastener, and the guiding groove is located on the interface card fastener when the guiding bump is mounted on the surface of the computer case.

6. A computer case according to claim 1 further comprising a side plate connected to the surface of the computer case for pressing the interface card fastener against the connecting surface so that the pressing surface presses the extension piece against the connecting surface.

7. An interface card fastener mounted on a computer case, comprising:
   a body pivotally connected to a surface of the computer case;
   a pressing plate extending from the body for pressing an extension plate of an interface card against a connecting surface protruded from the surface of the computer case; and
   an elastic element mounted on the pressing plate for further pressing the extension plate against the connecting surface.

8. An interface card fastener according to claim 7, wherein the computer case comprises a positioning portion which the connecting surface is formed on.

9. An interface card fastener according to claim 7, being mounted on an exterior of the computer case.

10. An interface card fastener according to claim 7 further comprising a locking element for locking the interface card fastener on the surface of the computer case.

11. An interface card fastener according to claim 7, wherein the pressing plate presses a plurality of extension plates of a plurality of interface cards against the connecting surface of the computer case simultaneously.

12. An interface card fastener according to claim 7, wherein the body is connected to the surface of the computer case through a pivot, and an axis of which is perpendicular to the surface of the computer case.

13. An interface card fastener according to claim 7, wherein the body is connected to the surface of the computer case through a pivot, and an axis of which is parallel to the surface of the computer case.

14. An interface card fastener according to claim 7 further comprising a blocking plate extending from the pressing plate for preventing the extension plate from sliding.

15. An interface card fastener, comprising:
   a body mounted on a surface of a computer case and slidable thereon;

a pressing plate extending from the body for pressing an extension plate of an interface card against a connecting surface protruding from the surface of the computer case; and an elastic element mounted on the pressing plate for further pressing the extension plate against the connecting surface.

16. An interface card fastener according to claim 15 further comprising a guiding bump mounted on the body, wherein the surface of the computer case has a guiding groove for the guiding bump sliding therein.

17. An interface card fastener according to claim 15, wherein the surface of the computer case has a guiding bump, and the body has a guiding groove for the guiding bump sliding therein.

18. An interface card fastener according to claim 15 further comprising a locking element for locking the interface card fastener on the surface of the computer case.

* * * * *